United States Patent [19]

Fracke et al.

[11] 3,851,404

[45] Dec. 3, 1974

[54] APPARATUS FOR DRYING PARTICULATE MATTER WITH GASEOUS MEDIA

[75] Inventors: Aribert Fracke; Heinrich Klein; Rudolf Pieper, all of Erlangen; Eduard Weber, Nurnberg; Hans Wachtler, Erlangen, all of Germany

[73] Assignee: Siemens Aktiengesellschaft, Berlin & Munich, Germany

[22] Filed: Mar. 22, 1971

[21] Appl. No.: 126,870

Related U.S. Application Data

[63] Continuation of Ser. No. 817,628, April 18, 1969, abandoned, which is a continuation of Ser. No. 621,333, March 7, 1967, abandoned.

[30] Foreign Application Priority Data

| Mar. 10, 1966 | Germany | 102434 |
| Mar. 12, 1966 | Germany | 102490 |
| Jan. 20, 1967 | Germany | 107918 |

[52] U.S. Cl. .................. 34/56, 34/5.7 E, 34/10, 55/266, 55/269, 55/DIG. 32, 99/201, 159/4 E, 159/6, 159/44

[51] Int. Cl. ............................................. F26b 13/20

[58] Field of Search ...... 55/162, DIG. 32, 261, 459, 55/266, 264; 209/144, 211; 263/21 A, 21 R; 137/624.18, 624.19, 624.20; 23/277, 284; 210/512; 159/4 E, 6, 44; 99/201; 34/10, 54, 56, 57 R, 57 E

[56] References Cited
UNITED STATES PATENTS

| 1,872,783 | 8/1932 | Miller | 55/162 |
| 2,413,420 | 12/1946 | Stephanoff | 55/DIG. 32 |
| 2,843,265 | 7/1958 | Rakowsky | 55/459 UX |
| 3,124,160 | 3/1964 | Zilberfarb | 137/624.18 X |
| 3,199,268 | 8/1965 | Oehlrich et al. | 55/261 |
| 3,199,269 | 8/1965 | Oehlrich et al. | 55/261 |
| 3,199,270 | 8/1965 | Oehlrich | 55/261 |
| 3,219,420 | 11/1965 | Dielenberg | 209/144 X |
| 3,495,949 | 2/1970 | Niedner et al. | 263/21 A |
| 3,600,817 | 8/1971 | Klein | 55/261 |

FOREIGN PATENTS OR APPLICATIONS

| 752,353 | 7/1956 | Great Britain | 55/261 |
| 992,386 | 5/1965 | Great Britain | |
| 640,354 | 5/1962 | Italy | 55/261 |

Primary Examiner—Frank W. Lutter
Assistant Examiner—Vincent Gifford
Attorney, Agent, or Firm—Curt M. Avery

[57] ABSTRACT

A circulatory flow apparatus for drying particulate matter with gaseous media has a cylindrical, preferably vertically elongated vessel and a central inlet duct for particle-laden gas protruding from below into the vessel so as to form an annular interspace in the lower portion of the vessel. The upper portion has lateral gas injection nozzles extending in tangential and downwardly inclined directions for causing separation of particle material by circulatory flow forces. Several axially spaced tiers of lateral gas inlets communicate with the annular interspace to produce rings of ring-shaped accumulated particle material freely floating and rotating about the central duct. Roughness structures protrude from the vessel wall into the annular interspace to cause loosening of the accumulations in the floating rings. A control sequence intermittently throttles the gas supply to the tiers of inlets in an upwardly progressing tier sequence for controlling the dwell time of the particles in the floating rings.

2 Claims, 2 Drawing Figures

APPARATUS FOR DRYING PARTICULATE MATTER WITH GASEOUS MEDIA

This application is a continuation of Ser. No. 817,628 filed on Apr. 18, 1969, and now abandoned, which was a continuation of Ser. No. 621,333 filed on Mar. 7, 1967 and now abandoned.

Our invention relates to apparatus for drying particulate matter with gaseous media, such as for effecting an exchange of substance and heat between solid or liquid particles on the one hand and gases on the other hand. In one of its more specific aspects the invention concerns apparatus for drying purposes and apparatus for performing chemical reactions by application and utilization of forces occurring in a circulatory flow composed of a potential flow and a rotational flow. Generally, the technological utilization of the circulatory-flow principle is known, for example from U.S. Pat. Nos. 3,199,268 and 3,199,272, to which reference may be had for a more detailed description and explanation of the phenomena involved.

The processing of solid or liquid particles, for example for drying purposes or for subjecting them to other physical or chemical treatments, often encounters difficulties due to the fact that the dwell time of the individual particles, as may be required for the desired effect or reaction, cannot or only inaccurately be adjusted or controlled. It has also been difficult to perform a reaction with chemically aggressive particulate materials because in conventional equipment and processes the particles are flung against the wall of the reaction chamber, which may cause damaging or destruction of the wall. Similar trouble is involved with readily cohering or tacky particles which may adhere to the wall and thus, in time, may interfere with the required fluid flow.

It is an object of our invention to minimize or obviate such difficulties.

To this end, and in accordance with our invention, we utilize a so-called circulatory flow within a rotationally symmetrical chamber. Such a circulatory flow is constituted of a helical potential flow in the vicinity of the chamber wall, this flow having an axial component toward one axial side, for example toward the bottom, of the chamber. At that side of the circulatory chamber, the helical potential flow causes a vortex sink in which the flow is guided inwardly on spiral-shaped paths toward the axis of the chamber. Thence a rotational-flow component, rotating in the same sense as the potential flow, commences to advance in the opposite direction toward a vortex source axially spaced from the vortex sink. This rotational flow advancing toward the opposite side of the processing chamber, is comparable to the vortex filament or wind hose of a natural tornado.

A circulatory flow of the type just described can be excited by applying gas through an axial inlet duct into the chamber and injecting auxiliary gas into the chamber through inlets or nozzles whose injection axis extends tangentially to the chamber and is inclined toward the vortex sink. The corresponding excitation may also be produced by imparting a pre-twisting motion to the gas supplied through the inlet duct, or both ways of circulatory-flow excitation may be applied simultaneously. The vortex source and the centrifugal forces which in the rotational flow are directed outwardly, have the effect of flinging any particles entrained in the main-gas or auxiliary-gas flow away from the centrally located rotational flow. These particles first enter in a mixing or intermediate region between the potential and the rotational flow, where the particles form ring-shaped or strand-shaped accumulations. When the ring-shaped accumulations become overloaded, the particles break away and travel along a branch of the potential flow into a collecting chamber which concentrically surrounds the central gas inlet duct, to be drained or conveyed to a bunker or conveyor.

As far as described above, the phenomena of circulatory-flow separation, as well as structural means suitable for technological production and utilization of these phenomena, are known. By virtue of the present invention, these phenomena are further utilized in an improved manner so as to permit an accurate control of the dwell time in the processing of solid or liquid particle material.

To achieve this end, and in accordance with the invention, we provide a processing vessel with a rotationally symmetrical, preferably tubular and axially elongated circulatory-flow chamber with a central gas inlet duct of smaller diameter than the vessel, the duct protruding coaxially into the chamber and forming therewith an annular interspace. The gas supplied through the central duct preferably serves as the carrier of the solid or liquid particle material. Instead, or additionally, such material may also be supplied by gas entrainment through lateral inlets such as the injection inlets mentioned presently. At one side, preferably above the opening of the inlet duct if an upright installation of the vessel is employed, the vessel is provided with lateral gas injection inlets for causing the particles to be separated from the gas in the circulatory-flow chamber. These inlets have a tangential injecting direction inclined toward the opening of the central inlet duct. We further provide the vessel with several axially spaced tiers or rings of peripherally distributed inlets for a reaction medium serving to produce rings of accumulated particle material freely floating and rotating in the annular interspace about the central duct. It has been found that when two mutually opposed circulatory flows are brought together, there occurs a concentration of the particles in the freely floating, rotating rings of accumulated material at the localities at which the axial components of the two circulatory flows just compensate each other to zero and thus produce a quiescent plane. At this locality, the rotating ring-shaped accumulations can be kept for any desired length of time. Such mutually opposed circulatory flows may be produced, for example, by arranging the injection inlets for the reaction medium tangentially to the vessel or jacket of the circulatory-flow chamber and perpendicularly to the chamber axis. Another way of producing such quiescent planes is to have the inlets in one of two axially adjacent tiers extend in directions inclined toward the injection directions of the other tier.

With various kinds of particulate material the rotating rings of particle material may possess such a high density that they are not always in sufficient contact with supplied reaction agents. This occurs particularly with chemical reactions, such as a mixture of fuel and oxidant gases for combustion purposes. For example, when moist or wet coal dust is supplied to a combustion chamber operating on the circulatory-flow principle, the carbon particles will burn in the outer range of the individual dust rings that are kept floating, whereas the combustion in the interior of the rings is rather incomplete.

It is another object of our invention, therefore, to provide means for loosening the particle rings and to increase their dimensions axially as well as radially. According to another feature of our invention, we attain this effect by providing the above-mentioned annular interspace with roughness protuberances on the inner wall of the processing vessel, which are located between the individual tiers of the lateral inlets and extend parallel to the axis of the circulatory-flow chamber.

These roughening means may bulge inwardly and, for example, consist of welds. They may also be formed of suitably profiled ledges or bars of a stable material. The effect of the roughing means is to increase the diameter of the particle rings and to improve the gas exchange inside the rings. In principle, they operate by tearing open the boundary layer beneath the particles, so that the exchange of substance and heat is improved. The turbulence of the flow can be improved further by giving the roughing means sharp edges. The fluctuations in flow speed caused by the turbulence of the gas current, then result in a continuous variation in the relative speed of the solid or liquid particles in comparison with the speed of the gas in the ring, so that continuously new gas particles pass along each individual solid or liquid particle.

The roughing means may also be formed of flat profile pieces. These are preferably stuck into milled grooves or slots of the jacket or wall of the circulatory-flow chamber so that a portion of the profile pieces protrudes to the outside in order to also serve as a cooling vane.

If several rings of accumulated particle material are produced, the desired reaction may require maintaining accurately defined dwell periods for the particles in the respective rings. This requires issuing the particles from one ring to the next following ring in an accurately defined manner, namely so that the following ring is skipped by a lowest feasible number of particles and the particles are not prematurely discharged from the group of dust rings.

According to another feature of our invention, the dwell time and the accumulating capacity of the described freely floating rotating particle rings is controlled or regulated by means of a device which comprises at least one throttle valve in the supply lines of each tier of inlets. The actuating members of these throttle valves are connected to a common control device which sequentially issues closing commands of short duration simultaneously to the throttle valves of each tier of inlets, starting from the inlet tier beneath the lowermost particle ring and progressing continually in the upward direction.

It will be understood that in the foregoing and following references to upward and downward directions, we are referring to preferred embodiments of our invention according to which the central duct enters into the circulatory-flow chamber from below and the main gas outlet of each chamber is located at the top, the axis of the chamber extending in the vertical direction. However, the apparatus may also be mounted in inclined or horizontal positions since the phenomena described are mainly dependent upon circulatory-flow forces, namely Coriolis and centrifugal forces, rather than gravity. In vertical arrangements, however, advantageous use of gravity can be readily made additionally for securing a better uniformity of the dust rings and facilitating drainage of the particle material discharged from the dust rings.

The invention will be further described with reference to embodiments of processing apparatus according to our invention illustrated schematically and by way of example on the accompanying drawings in which.

Figure 1:
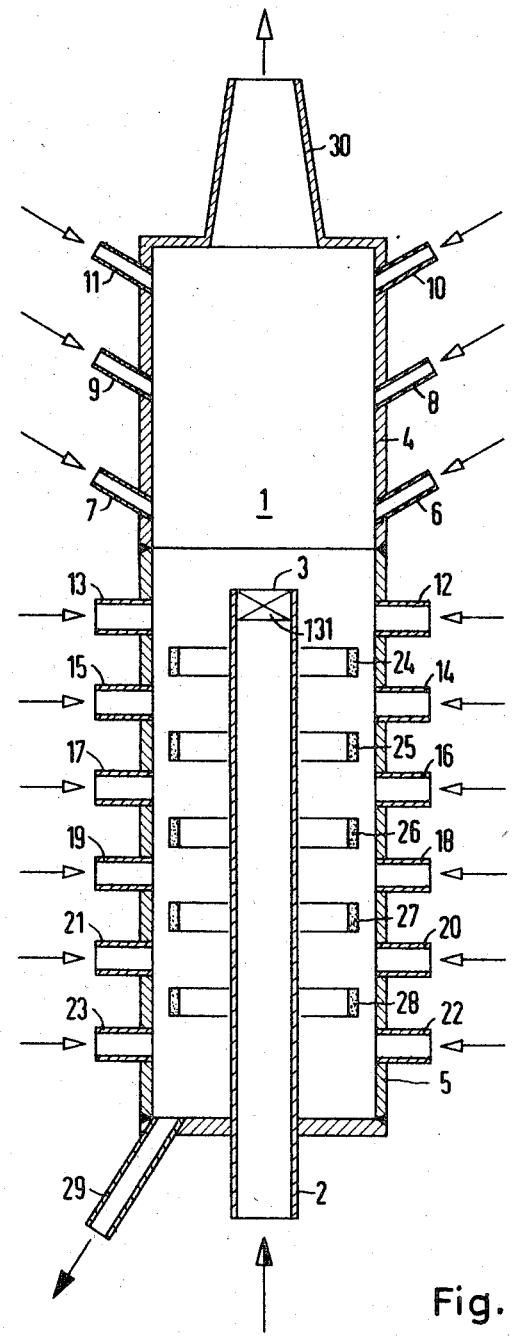
FIG. 1 is a vertical section through a circulatory-flow processing apparatus according to the invention.

According to FIG. 1, the circulatory-flow chamber 1 of the illustrated vessel is provided with a central and coaxial inlet duct 2 for the supply of gas, preferably a carrier gas laden with the solid or liquid particles to be processed. The inlet duct 2 protrudes from the bottom of the apparatus upwardly to approximately the middle of the circulatory flow chamber 1. The chamber portion located above the opening 3 of the central duct 2 essentially constitutes a circulatory-flow separator 4 in which the solid or liquid particles are separated from the gas before the clean gas escapes through the outlet 30 on top of the chamber. The portion of the apparatus located substantially below the inlet opening 3 of the central duct 2 constitutes the reaction container 5 proper in which the above-mentioned suspended rings of accumulated particles are produced and maintained.

The separator portion 4 is equipped with six inlet ducts or nozzles 6 to 11 for injecting auxiliary gas. The injecting direction of these nozzles is tangential and inclined downwardly toward the opening 3 of the central duct 2. Due to the injected auxiliary gas, a potential flow having a downward component is superimposed upon the upward flow of gas issuing from the outlet opening 3 of duct 2. The potential flow occurs in the vicinity of the cylindrical chamber wall and converts somewhat above the opening 3 to a rotational flow which extends inward of the downward potential flow and has an upwardly directed component. As mentioned, this rotational flow is comparable to a vortex filament or the wind hose of a natural tornado. As a result of these flow phenomena, more fully explained in the above-mentioned U.S. patents, the particles supplied through the gas inlet ducts 2 (or through any lateral inlets) are forced out of the axial rotational flow and become entrained by the potential flow, thus being carried downward into the lower portion of the separator chamber and into the annular reaction chamber 5. Located beneath the gas inlet opening 3 there are tangential inlet ducts or nozzles 12 to 23 for the supply of further reactant or auxiliary gas. In the illustrated embodiment, these additional inlets have a direction perpendicular to the axis of the circulatory flow. Hence each tier of gas inlets communicating with the annular interspace between the gas inlet duct 2 and the cylindrical jacket or wall of the apparatus, lies substantially in a horizontal plane.

The particles separated in the upper portion 4 of the circulatory-flow chamber 1 pass first into the quiescent area between the nozzle tiers 12–13 and 14–15 where they collect in a freely floating and rotating ring schematically shown at 24. As further particle material is being continuously supplied through the duct 2, there will occur at a given moment, a condition at which the uppermost particle ring 24 attains its full charge-retaining capacity. Thereafter a portion of the accumulated particles abruptly breaks away and issues to the next lower ring 25 located between the nozzle tiers 14–15 and 16–17. Such a transfer to each next following particle ring takes place whenever the accumulating capacity of the preceding one is exhausted. When ultimately the lowermost ring 28 which, in the illustrated embodiment, is located between the nozzle tiers 20–21 and 22–23, is being dissolved, the particles issuing from this ring drop onto the bottom of the processing chamber from which they can be drained through an outlet tube 29. Any particles residually remaining in the flow may become entrained in the rotational flow ascending concentrically to the inlet duct 2 and are then again subjected to the separating forces in the upper portion 4 of the apparatus and again supplied to the reaction space 5 between the inlet duct and the surrounding vessel wall. As a result, only gases liberated from particles will issue through the gas outlet 30 on top of the apparatus.

Since each particle ring has only a given accumulating capacity and transfers excessive particles to the next following ring, the dwell time can be accurately determined by controlling the supply of charging material or gas. The number of nozzle tiers can be chosen in accordance with the dwell time to be set. For a given dwell time, the particles may be supplied in small quantities in order to keep rotating a relatively long period of time in a relatively small number of rings. With larger throughput quantities, it has been found more favorable, however, to provide for a larger number of rings (and hence tiers) one above the other, with a correspondingly shorter dwell time of the particles in each individual ring.

In order to reduce the excitation energy required for development of the circulatory flow, a twisting nozzle 131 may be mounted in the opening 3 of the gas inlet conduit 2. Suitable is a twisting nozzle formed of guiding vanes which impose a pre-twist upon the entering particle-laden raw gas.

With apparatus according to the invention as exemplified in FIG. 1, numerous reactions of a great variety of types may be performed. Among these, for example, are the exchange of substance or heat between gaseous and solid or liquid particles. This may be used particularly for drying solid or liquid particles. The heating and drying gases enter through the nozzles 12 to 22 and maintain the still moist particles in the above-described floating rings for such a length of time that the desired degree of drying is attained. The dried material is subsequently discharged through the outlet 29. The drying gases leave the apparatus in pure condition through the axial outlet 30. This permits recycling the gases after each heat exchange back to the nozzles 12 to 23, thus affording a continuous circulation of heating gas. If desired, the auxiliary gas inlets 6 to 11 in the separator portion 4 of the apparatus may also be supplied with heating or reaction gases in order to still further increase the efficacy of the circulatory-flow chamber. Suitable for drying are particles of any geometric dimensions and greatly different specific gravity. If desired, however, a classifier may be inserted ahead of the apparatus from which the properly classified particles are supplied to several parallel operating drying chambers according to the invention.

Figure 2:
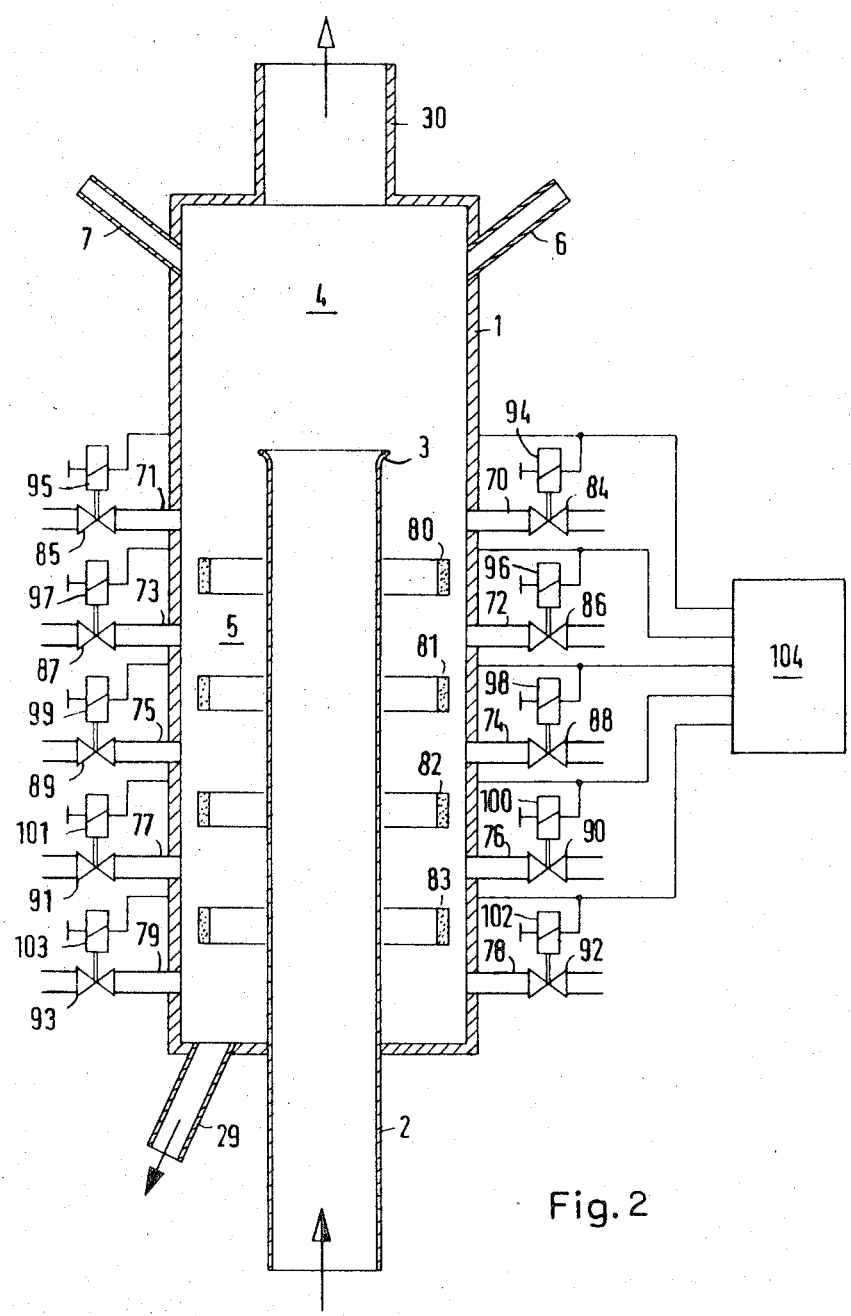
FIG. 2 shows schematically and in vertical section a second embodiment of apparatus according to the invention.

FIG. 2 represents an example of a system for controlling the individual rings of dust accumulation in the above-described manner. Connected in the supply lines of the individual tiers of nozzles are throttle valves 84 to 93 which are actuated by respective control members 94 to 103. The control members are connected to a common control device 104 which issues closing or throttling commands in a manner still to be described.

Assume that all of the particle rings are just fully charged. Under these conditions, the above-described apparatus in conjunction with a control system as shown in FIG. 2, operates as follows:

First the control members 102 to 103 of valves 92–93 beneath the lowermost particle ring 83 receive a short closing signal. This interrupts for a short interval of time the flow acting against the particle ring from below. Thus the quiescent plane in which the ring is located, is dissolved, and the effect of the auxiliary gas entering through inlets 76 and 77 now forces the particle ring 83 downward so that the particles of this ring are discharged through the outlet 29. When thereafter the throttle valves 92–93 again open, a new quiescent plane is formed between the inlet tiers 76–77 and 78–79. Now the particles from ring 82 are to be caused to issue into the still empty plane for ring 83. For this purpose, a short-lasting closing signal is given to the control members 100–101 of respective throttle valves 90–91. This eliminates the flow component acting upwardly from the inlet tier 76–77. Thus the particles are forced downwardly. Such throttling of the valves for the inlet tier 76–77 must last only as long as is needed for the particles to pass from ring 82 beyond the nozzle openings of the inlet tier 76–77, so that when the particles reach the plane of ring 83, the stabilizing flow conditions are reestablished. Thereafter, the valves 88–89 for inlet tier 74–75 are short-lastingly throttled for analogously passing the particles from ring 81 into the ring 82. Then the valves 86–87 are throttled in an analogous manner so that the particles from the uppermost ring 80 are transferred into the next lower ring, and new particles for filling the uppermost ring can be supplied.

The control device 104 comprises the conventional components for timing the individual closing signals, so that the dwell time in the individual rings are consequently the total dwell time of a particle in the circulatory-flow chamber can be set in accordance with a desired program. U.S. Pat. Nos. 2,871,978 and 1,118,045 show conventional timer control means sequentially controlling solenoid operated valves. Suitable other control components may be provided for adjusting the intensity and time period of throttling for the individual valves in conventional manner.

It will be understood that apparatus according to the invention are not limited to the above-described features of the illustrated embodiments. For example, each tier of inlets may be provided with only one throttle valve, or each individual inlet may have its own valve, or groups of valves may be combined to form a unit. The described devices afford maintaining the rings of accumulations in the circulatory-flow chamber for any desired length of time. Furthermore, the retaining capacity of the individual rings can be accurately controlled by correspondingly adjusting the quantity of injected auxiliary gas. With larger gas quantities and larger gas speeds, more particles can be held in a ring than with smaller quantities or smaller speeds. Furthermore, the number of the dust rings can be chosen in accordance with the dwell time to be adjusted. For a given dwell time of the particles, a selection of smaller quantities of dust supply per unit time will permit keeping a smaller number of rings rotating for a longer period of time than with larger throughput quantities, it being preferable in the latter case to provide for a larger number of rings and to assign a shorter dwell time to each of them.

It should further be understood that the above-described invention is not limited to circulatory-flow chambers with vertical axes but is applicable analogously with horizontal or inclined chambers, since even in a horizontal position the particles are maintained in defined dust rings and are guided in the same manner as described in the foregoing. By closing or throttling of a nozzle tier, the rings will then travel horizontally toward the nozzle tier whose gas supply is interrupted at that time, and ultimately the dust rings are discharged from the circulatory-flow chamber exclusively with the aid of the above-described flow phenomena or, if desired, with additional aid by gravity.

Measuring or sensing devices may be provided in the vicinity of the particle outlet 29 in order to ascertain whether the desired treatment has been fully performed. In the event the condition of the treated material departs from the desired datum condition, necessary corrections can be made as to the sequencing periods of the closing and throttling signals issuing from the common valve control device, as well as a variation with respect to the required throttling or closing intervals. It should be noted that, for discharging the material out of one particle ring into the next particle ring, the supply of auxiliary gas need not be fully interrupted, it being sufficient to correspondingly throttle the gas flow.

In the event of sudden trouble requiring a rapid shutdown, all of the valves for the reaction medium, such as 84 to 93, can be blocked simultaneously. This results in an extremely rapid discharge of the particles. Since generally the auxiliary gas injection through the inlets 6, 7 in the upper portion 4 of the circulatory-flow chamber is not interrupted, the entire apparatus then operates only as a dust-from-gas separator.

Apparatus according to the invention are further applicable, for example, for endothermic and exothermic chemical reactions, including combustion processes. When using the apparatus for chemical reactions, the invention offers the further advantage that the particle rings do not touch the wall of the reaction space so that any occurring high reaction temperatures are kept away from the wall, thus permitting the use of a wall material of lower quality than otherwise necessary. Apparatus according to the invention are also suitable for drying liquid substance, such as milk, to convert it to pulverulent constitution. Conversely, an intensive and uniform moistening of suspended particles may be effected in this manner.

Upon a study of this disclosure such and other modifications and applications of the invention will be obvious to those skilled in the art and are indicative of the fact that the invention may be given embodiments other than particularly illustrated and described herein, without departing from the essential features of our invention and within the scope of the claims annexed hereto.

We claim:

1. Apparatus for drying particulate matter with gaseous media, comprising a vessel having a rotationally symmetrical vortex chamber with a substantially vertical axis wherein a combined gas flow composed of a potential flow and a rotational flow is to be produced, said chamber including a central gas inlet duct protruding coaxially into said chamber and forming therewith a lower annular chamber portion and an upper chamber portion communicating with said lower chamber portion, said duct having an opening facing toward said upper chamber portion for introducing a particle laden gas stream into said upper chamber portion, said upper chamber portion having a centrally located gas outlet, lateral gas injection inlets communiclating with said upper chamber portion and axially spaced from the opening of said duct, said inlets having a direction tangential to said chamber and inclined toward said duct opening, and a plurality of further inlet means tangentially communicating with said annular interspace of said lower chamber portion, said plurality of further inlet means being peripherally distributed and arranged in pairs respectively in several spaced tiers axially spaced along said duct for supplying gaseous medium at the respective tiers to cause accumulation of said particle material in the form of freely floating rings coaxially around said duct and respectively between adjacent spaced tiers, said plurality of further inlet means respectively defining a flow path disposed in a plane extending at a right angle to the axis of said duct and vessel.

2. Apparatus for drying particulate matter with gaseous media, comprising a vessel having a rotationally symmetrical vortex chamber with a substantially vertical axis wherein a combined gas flow composed of a potential flow and a rotational flow is to be produced, a central gas inlet duct having a smaller diameter than said chamber and protruding coaxially into said vessel at the lower end thereof so as to form an annular interspace around said duct in said vessel, a centrally located gas outlet formed in said vessel at the upper end thereof, lateral gas injection inlets communicating with said chamber at localities outside of said interspace and axially spaced from the opening of said duct, said inlets having a direction tangential to said chamber and inclined toward said duct opening, and a plurality of further inlet means communicating with said annular interspace for supplying reaction medium to cause accumulation of said particle material in the form of freely floating rings coaxially around said duct, said a plurality of further inlet means being peripherally distributed and arranged in several spaced tiers axially spaced along said duct, said tiers of inlets having gas supply lines and having in said lines at least one controllable throttle valve for each of said respective tiers, and sequence control means connected to said valves for controlling them to sequentially throttle the gas supply to said respective tiers in a sequence progressing in the axial direction from the tier most remote from said duct opening.

* * * * *